United States Patent [19]
Janeczko et al.

[11] Patent Number: 6,088,165
[45] Date of Patent: Jul. 11, 2000

[54] ENHANCED NIGHT VISION DEVICE

[75] Inventors: Donald John Janeczko, Fincastle; Ronald Croffard Crabtree, Roanoke; Gary Morgan Vance, Roanoke, all of Va.

[73] Assignee: ITT Manufacturing Enterprises, Wilmington, Del.

[21] Appl. No.: 09/300,995

[22] Filed: Apr. 28, 1999

Related U.S. Application Data

[60] Provisional application No. 60/123,109, Mar. 5, 1999.

[51] Int. Cl.⁷ .............................. G02B 27/14; G02B 5/30; G02B 23/00; H01J 40/14
[52] U.S. Cl. .................................... 359/629; 250/214 VT; 359/353; 359/409
[58] Field of Search ............................ 250/214 VT, 330, 250/333; 359/353, 351, 407, 409, 410, 431, 618, 629, 634, 808, 815, 819, 894

[56] References Cited

U.S. PATENT DOCUMENTS

| | | | |
|---|---|---|---|
| 3,971,933 | 7/1976 | Adamson, Jr. ................. | 250/213 VT |
| 4,653,879 | 3/1987 | Filipovich .......................... | 350/530 |
| 5,282,082 | 1/1994 | Espie et al. ........................ | 359/353 |
| 5,331,459 | 7/1994 | Dor .................................... | 359/409 |
| 5,535,053 | 7/1996 | Baril et al. ......................... | 359/409 |
| 5,644,425 | 7/1997 | Palmer ............................... | 359/409 |
| 5,699,194 | 12/1997 | Takahashi ......................... | 359/633 |
| 5,701,202 | 12/1997 | Takahashi ......................... | 359/631 |
| 5,712,726 | 1/1998 | Espie et al. ....................... | 359/419 |
| 5,786,932 | 7/1998 | Pniel ................................. | 359/409 |

*Primary Examiner*—Georgia Epps
*Assistant Examiner*—David N. Spector
*Attorney, Agent, or Firm*—Pollock Vande Sande & Amernick

[57] ABSTRACT

A night vision device comprising a facemask housing assembly having a peripheral surface defined by a rear surface contoured to a user's face and an open front surface, the housing assembly operative for encasing a pair of optical assemblies operative for receiving light from a viewed object via a first folded optical path and via a second direct optical path, combining the light from the first and second paths, and directing the combined light to a user's eye for viewing the object; where each optical assembly detachably coupled to the housing assembly. Each optical assembly comprises an objective lens assembly for receiving and focusing visible and infrared light from a viewed object along the first folded optical path; image intensifier means responsive to the focused light from the objective lens assembly for converting the visible and infrared light to visible intensified light; and beam combining means responsive to the visible intensified light and to the direct path light for combining with one another and directing the combination to the user's eye for viewing.

20 Claims, 17 Drawing Sheets

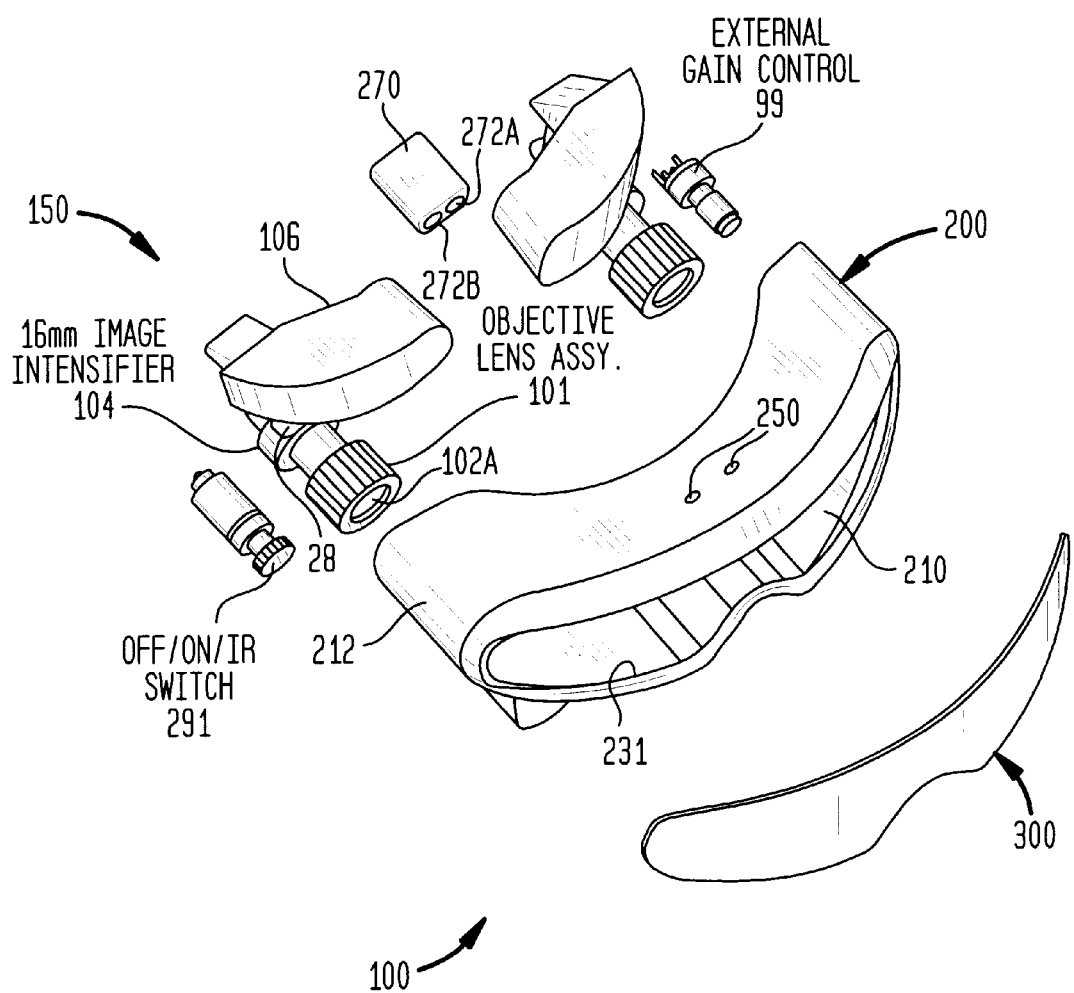

FIG. 10A

```
*LENS DATA
OBJECTIVE ASSEMBLY (1)
  SRF      RADIUS      THICKNESS    APERTURE RADIUS    GLASS     SPE    NOTE
   0         --        1.0000e+20    3.6397e+19         AIR       C
   1      16.535640     4.750000    12.500000  X       LAFN21     C
   2      40.355187     0.100000    12.000000          AIR
   3      15.284189     2.499678    10.250000          BK7        C
   4      19.271655     1.720553     9.250000          AIR
   5      54.440335     1.500000    10.000000          BASF51     C
   6       9.278147     3.930429     7.250000          AIR
   7         --            --        7.000000  X       BK7        C
   8         --         3.845983     7.000000  A       AIR
   9     -20.670500     8.254593     8.000000          BK7        C
  10     -10.493357     1.500000     9.000000          SFL6       C
  11     -32.146943     0.100000    10.500000          AIR
  12     142.150393     4.750000    11.000000          LAFN21     C
  13     -20.663514     0.100000    11.000000          AIR
  14      27.027773     5.000000    11.500000  X       LAFN21     C
  15     -42.130743     0.449256    11.000000          AIR
  16     -33.811163     1.500000    11.000000          SFL6       C
  17         --            --       11.000000          AIR
  18         --        11.000000    11.000000  X       BK7        C
  19         --       -11.000000    15.600000  X       REFLECT    *
  20         --        -1.000000    11.000000  X       AIR
  21         --        -2.160000     9.500000          FK5        C
  22         --        -0.765000     9.500000          AIR
  23         --            --        8.000000

*TILT/DECENTER DATA
   19    DT    1       DCX      --        DCY     --        DCZ     --
         BEN           TLA  45.000000     TLB     --        TLC     --

*OPERATING CONDITIONS: GENERAL
   IMAGE SURFACE:                  23        APERTURE STOP:                      8
   EVALUATION MODE:             FOCAL        REFERENCE SURFACE:                  8
   ABERRATION MODE:        TRANSVERSE        APERTURE CHECKING IN RAYTRACE:     ON
   NUMBER OF RAYS IN FANS:         21        DESIGNER:                         OSLO
   UNITS:                          mm        PROGRAM:    OSLO SIX REV. 5.10 BCT-A
   WAVEFRONT REF SPH POS:   EXIT PUPIL       OPD REPORTED IN WAVELENGTHS:       ON
   CALLBACK LEVEL:                  1        PRINT SURFACE GROUP DATA:         OFF
   COMPUTE SOLVES IN CONFIGS:     OFF
   TELECENTRIC ENTRANCE PUPIL:    OFF        WIDE-ANGLE RAY AIMING MODE:       OFF
   APER CHECK ALL GRIN RAY SEGS:  OFF        EXTENDED-APER RAY AIMING MODE:    OFF
   PLOT RAY-INTERCEPTS AS H-TAN U: OFF       XARM BEAM ANGLE:            90.000000
   SOURCE ASTIGMATIC DIST:         --        RAY AIMING MODE:            APLANATIC
   TEMPERATURE:             20.000000        PRESSURE:                    1.000000

* SOLVES
  NO SOLVE DATA

* PICKUPS
  NO PICKUP DATA
```

FIG. 10B

```
*APERTURES
   SRF    TYPE    APERTURE RADIUS
    0     SPC     3.6397e+19
    1     SPC     12.500000
       SPECIAL APERTURE GROUP 0:
       A   ATP        ELLIPSE  AAC    TRANSMIT  AAN         --
           AX1     -12.500000  AX2    12.500000 AY1   -12.500000  AY2    12.500000
    2     SPC     12.000000
    3     SPC     10.250000
    4     SPC      9.250000
    5     SPC     10.000000
    6     SPC      7.250000
    7     SPC      7.000000
       SPECIAL APERTURE GROUP 0:
       A   ATP        ELLIPSE  AAC    TRANSMIT  AAN         --
           AX1      -6.800000  AX2     6.800000 AY1    -6.800000  AY2     6.800000
    8     SPC      7.000000
    9     SPC      8.000000
   10     SPC      9.000000
   11     SPC     10.500000
   12     SPC     11.000000
   13     SPC     11.000000
   14     SPC     11.500000
       SPECIAL APERTURE GROUP 0:
       A   ATP        ELLIPSE  AAC    TRANSMIT  AAN         --
           AX1     -11.500000  AX2    11.500000 AY1   -11.500000  AY2    11.500000
   15     SPC     11.000000
   16     SPC     11.000000
   17     SPC     11.000000
   18     SPC     11.000000
       SPECIAL APERTURE GROUP 0:
       A   ATP      RECTANGLE  AAC    TRANSMIT  AAN         --
           AX1     -11.000000  AX2    11.000000 AY1   -11.000000  AY2    11.000000
   19     SPC     15.600000
       SPECIAL APERTURE GROUP 0:
       A   ATP      RECTANGLE  AAC    TRANSMIT  AAN         --
           AX1     -11.000000  AX2    11.000000 AY1   -15.600000  AY2    15.600000
   20     SPC     11.000000
       SPECIAL APERTURE GROUP 0:
       A   ATP      RECTANGLE  AAC    TRANSMIT  AAN         --
           AX1     -11.000000  AX2    11.000000 AY1   -11.000000  AY2    11.000000
   21     SPC      9.500000
   22     SPC      9.500000
   23     SPC      8.000000
*WAVELENGTHS
   CURRENT    WV1/WW1      WV2/WW2      WV3/WW3
      1       0.800000     0.640000     0.870000
              1.000000     0.500000     0.500000
*REFRACTIVE INDICES
```

FIG. 10C

| SRF | GLASS | RN1 | RN2 | RN3 | VNBR | TCE |
|---|---|---|---|---|---|---|
| 0 | AIR | 1.000000 | 1.000000 | 1.000000 | -- | -- |
| 1 | LAFN21 | 1.776449 | 1.784359 | 1.774086 | 75.585967 | 62.000000 |
| 2 | AIR | 1.000000 | 1.000000 | 1.000000 | -- | 236.000000 |
| 3 | BK7 | 1.510776 | 1.514846 | 1.509493 | 95.416790 | 71.000000 |
| 4 | AIR | 1.000000 | 1.000000 | 1.000000 | -- | 236.000000 |
| 5 | BASF51 | 1.710665 | 1.719291 | 1.708187 | 63.998165 | 54.000000 |
| 6 | AIR | 1.000000 | 1.000000 | 1.000000 | -- | 236.000000 |
| 7 | BK7 | 1.510776 | 1.514846 | 1.509493 | 95.416790 | 71.000000 |
| 8 | AIR | 1.000000 | 1.000000 | 1.000000 | -- | 236.000000 |
| 9 | BK7 | 1.510776 | 1.514846 | 1.509493 | 95.416790 | 71.000000 |
| 10 | SFL6 | 1.784360 | 1.797960 | 1.780589 | 45.153143 | 90.000000 |
| 11 | AIR | 1.000000 | 1.000000 | 1.000000 | -- | 236.000000 |
| 12 | LAFN21 | 1.776449 | 1.784359 | 1.774086 | 75.585967 | 62.000000 |
| 13 | AIR | 1.000000 | 1.000000 | 1.000000 | -- | 236.000000 |
| 14 | LAFN21 | 1.776449 | 1.784359 | 1.774086 | 75.585967 | 62.000000 |
| 15 | AIR | 1.000000 | 1.000000 | 1.000000 | -- | 236.000000 |
| 16 | SFL6 | 1.784360 | 1.797960 | 1.780589 | 45.153143 | 90.000000 |
| 17 | AIR | 1.000000 | 1.000000 | 1.000000 | -- | 236.000000 |
| 18 | BK7 | 1.510776 | 1.514846 | 1.509493 | 95.416790 | 71.000000 |
| 19 | REFLECT | 1.510776 | 1.514846 | 1.509493 | 95.416790 | 62.000000 |
| 20 | AIR | 1.000000 | 1.000000 | 1.000000 | -- | 236.000000 |
| 21 | FK5 | 1.482237 | 1.485800 | 1.481094 | 102.471029 | 92.000000 |
| 22 | AIR | 1.000000 | 1.000000 | 1.000000 | -- | 236.000000 |
| 23 | IMAGE SURFACE | | | | | |

*OPERATING CONDITION: SYSTEM NOTES
NO DEFINED OPERATING CONDITIONS

FIG. 10D

*LENS DATA
OBJECTIVE ASSEMBLY (1)

| SRF | RADIUS | THICKNESS | APERTURE RADIUS | | GLASS | SPE | NOTE |
|---|---|---|---|---|---|---|---|
| 0 | -- | 1.0000e+20 | 3.6397e+19 | | AIR | | |
| 1 | 16.535640 | 4.750000 | 12.500000 | X | LAFN21 | C | |
| 2 | 40.355187 | 0.100000 | 12.000000 | | AIR | | |
| 3 | 15.284189 | 2.499678 | 10.250000 | | BK7 | C | |
| 4 | 19.271655 | 1.720553 | 9.250000 | | AIR | | |
| 5 | 54.440335 | 1.500000 | 10.000000 | | BASF51 | C | |
| 6 | 9.278147 | 3.930429 | 7.250000 | | AIR | | |
| 7 | -- | -- | 7.000000 | X | BK7 | C | |
| 8 | -- | 3.845983 | 7.000000 | A | AIR | | |
| 9 | -20.670500 | 8.254593 | 8.000000 | | BK7 | C | |
| 10 | -10.493357 | 1.500000 | 9.000000 | | SFL6 | C | |
| 11 | -32.146943 | 0.100000 | 10.500000 | | AIR | | |
| 12 | 142.150393 | 4.750000 | 11.000000 | | LAFN21 | C | |
| 13 | -20.663514 | 0.100000 | 11.000000 | | AIR | | |
| 14 | 27.027773 | 5.000000 | 11.500000 | X | LAFN21 | C | |
| 15 | -42.130743 | 0.449256 | 11.000000 | | AIR | | |
| 16 | -33.811163 | 1.500000 | 11.000000 | | SFL6 | C | |
| 17 | -- | -- | 11.000000 | | AIR | | |
| 18 | -- | 11.000000 | 11.000000 | X | BK7 | C | |
| 19 | -- | -11.000000 | 15.600000 | X | REFLECT | | * |
| 20 | -- | -1.000000 | 11.000000 | X | AIR | | |
| 21 | -- | -2.160000 | 9.500000 | | FK5 | C | |
| 22 | -- | -0.765000 | 9.500000 | | AIR | | |
| 23 | -- | -- | 8.000000 | | | | |

FIG. 11A

*LENS DATA
  OCULAR ASSEMBLY (6)

| SRF | RADIUS | THICKNESS | APERTURE RADIUS | GLASS | SPE | NOTE |
|---|---|---|---|---|---|---|
| 0 | -- | 1.1169e+20 | 4.0653e+19 | AIR | | |
| 1 | -- | -- | 7.000000 AS | BK7 | C | |
| 2 | -- | 20.000000 | 7.000000 S | AIR | | |
| 3 | -- | -- | 16.000000 X | BK7 | C | |
| 4 | -98.815884 | -- | 21.089710 SX | REFLECT | | * |
| 5 | -- | -- | 21.089710 S | BK7 | C | * |
| 6 | 224.143773 | -- | 22.000000 X | REFLECT | | * |
| 7 | -- | -- | 19.318018 S | BK7 | C | * |
| 8 | -32.858059 | -- | 13.000000 X | AIR | | * |
| 9 | -- | 18.000000 | 9.000000 | SFL6 | C | * |
| 10 | -- | 1.500000 | 9.000000 | AIR | | |
| 11 | 21.965339 | 4.500000 | 13.000000 | BK7 | C | * |
| 12 | 59.382693 | 2.500000 | 13.000000 | AIR | | |
| 13 | 26.601557 | 6.000000 | 16.000000 | BK7 | C | * |
| 14 | -145.976759 | 3.200931 | 16.000000 | AIR | | |
| 15 | 23.385786 | 7.500000 | 13.000000 | BK7 | C | * |
| 16 | -35.833788 | 0.100000 | 13.000000 | AIR | | * |
| 17 | -- | 20.000000 | 10.000000 | BK7 | C | * |
| 18 | -- | 2.282636 | 10.000000 | AIR | | |
| 19 | -12.382575 | 2.886747 | 10.000000 | BK7 | C | * |
| 20 | -11.234677 | 1.226506 | 10.000000 | AIR | | * |
| 21 | -21.000000 | -- | 8.000000 | BK7 | C | * |
| 22 | -21.000000 P | -- | 8.000000 | AIR | | |
| 23 | -21.000000 P | -- | 8.000000 | | | |

*CONIC AND POLYNOMIAL ASPHERIC DATA

| SRF | CC | AD | AE | AF | AG |
|---|---|---|---|---|---|
| 8 | -- | 4.9801e-06 | -7.6002e-09 | -- | -- |
| 13 | -2.375280 | -- | -2.6623e-08 | -- | -- |
| 15 | -3.173701 | -- | -- | -- | -- |
| 16 | -9.727695 | -- | 1.0548e-07 | -- | -- |
| 19 | -- | 0.000198 | 1.4066e-06 | -- | -- |
| 20 | -- | 0.000110 | 2.4126e-06 | -- | -- |

*ASPHERIC SURFACE DATA
  4  ASP TRX    6 - ISO X-TORIC
     ASC3   7.7145e-06  ASA4  -7.4257e-07  ASC5   2.7326e-08  ASA6  -3.7244e-10
  6  ASP TRY    6 - ISO Y-TORIC
     ASD3      --       ASB4  -1.5370e-06  ASD5   1.5132e-07  ASB6  -5.6034e-09

*TILT/DECENTER DATA
  4  DT  1    DCX     --           DCY  -10.042012   DCZ   48.413314
     GC  1    TLA  -29.395636      TLB     --       TLZ      --
  5  DT  1    DCX     --           DCY     --       DCZ      --
              TLA  -27.000000      TLB     --       TLZ      --
  6  DT  1    DCX     --           DCY   23.613701   DCZ   38.947199
     GC  1    TLA  -68.611768      TLB     --       TLZ      --
  7  DT  1    DCX     --           DCY     --       DCZ      --
              TLA  -20.000000      TLB     --       TLZ      --
  8  DT  1    DCX     --           DCY  -23.221511   DCZ   31.598554

FIG. 11B

```
         GC  1      TLA  82.878870    TLB      --        TLC      --
   9  DT  1        DCX      --        DCY      --        DCZ      --
                   TLA  -0.526229     TLB      --        TLC      --
  11  DT  1        DCX      --        DCY   0.228727     DCZ      --
                   TLA  -16.426258    TLB   0.000100     TLC      --
  13  DT  1        DCX      --        DCY  -5.000338     DCZ      --
                   TLA  14.837340     TLB      --        TLC      --
  15  DT  1        DCX      --        DCY   4.101675     DCZ      --
                   TLA  -13.715544    TLB      --        TLC      --
  17  DT  1        DCX      --        DCY  -1.000000     DCZ      --
                   TLA   0.440364     TLB      --        TLC      --
  19  DT  1        DCX      --        DCY  -1.389335     DCZ      --
                   TLA  -0.196944     TLB      --        TLC      --
  20  DT  1        DCX      --        DCY  -0.262213     DCZ      --
                   TLA  -2.415111     TLB      --        TLC      --
  21  DT  1        DCX      --        DCY   1.754931     DCZ      --
                   TLA  12.559831     TLB      --        TLC      --
```

*SURFACE TAG DATA
```
   4      CVX   -0.011031    CCX       --
   6      CVX    0.005584
```

*OPERATING CONDITIONS: GENERAL
```
  IMAGE SURFACE:                    23       APERTURE STOP:                       1
  EVALUATION MODE:               FOCAL       REFERENCE SURFACE:                   1
  ABERRATION MODE:           TRANSVERSE      APERTURE CHECKING IN RAYTRACE:      ON
  NUMBER OF RAYS IN FANS:           21       DESIGNER:                         OSLO
  UNITS:                            mm       PROGRAM:    OSLO SIX REV. 5.10 BCT-A
  WAVEFRONT REF SPH POS:    EXIT PUPIL       OPD REPORTED IN WAVELENGTHS:        ON
  CALLBACK LEVEL:                    1       PRINT SURFACE GROUP DATA:          OFF
  COMPUTE SOLVES IN CONFIGS:       OFF
  TELECENTRIC ENTRANCE PUPIL:      OFF       WIDE-ANGLE RAY AIMING MODE:        OFF
  APER CHECK ALL GRIN RAY SEGS:    OFF       EXTENDED-APER RAY AIMING MODE:     OFF
  PLOT RAY-INTERCEPTS AS H-TAN U:  OFF       XARM BEAM ANGLE:             90.000000
  SOURCE ASTIGMATIC DIST:           --       RAY AIMING MODE:             APLANATIC
  TEMPERATURE:               20.000000       PRESSURE:                     1.000000
```

*SOLVES
  NO SOLVE DATA

*PICKUPS
```
  22    CV   21
  23    CV   21
```

*APERTURES
```
  SRF    TYPE    APERTURE RADIUS
   0     SPC       4.0653e+19
   1     CMP       7.000000
   2     CMP       7.000000
   3     SPC      16.000000
       SPECIAL APERTURE GROUP 0:
        A  ATP         ELLIPSE   AAC     TRANSMIT  AAN        --
           AX1     -20.000000    AX2    20.000000  AY1  -19.500000  AY2   15.500000
   4     CMP      21.089710
       SPECIAL APERTURE GROUP 0:
        A  ATP         ELLIPSE   AAC     TRANSMIT  AAN        --
           AX1     -26.000000    AX2    26.000000  AY1  -13.000000  AY2   40.000000
   5     CMP      21.089710
   6     SPC      22.000000
```

FIG. 11C

```
       SPECIAL APERTURE GROUP 0:
    A    ATP         ELLIPSE  AAC      TRANSMIT  AAN       --
         AX1   -25.000000  AX2   25.000000  AY1  -23.000000  AY2   23.000000
    7    CMP    19.318018
    8    SPC    13.000000
       SPECIAL APERTURE GROUP 0:
    A    ATP         ELLIPSE  AAC      TRANSMIT  AAN       --
         AX1   -14.000000  AX2   14.000000  AY1  -11.750000  AY2   11.000000
    9    SPC     9.000000
   10    SPC     9.000000
   11    SPC    13.000000
   12    SPC    13.000000
   13    SPC    16.000000
   14    SPC    16.000000
   15    SPC    13.000000
   16    SPC    13.000000
   17    SPC    10.000000
   18    SPC    10.000000
   19    SPC    10.000000
   20    SPC    10.000000
   21    SPC     8.000000
   22    SPC     8.000000
   23    SPC     8.000000
```

*WAVELENGTHS

| CURRENT | WV1/WW1 | WV2/WW2 | WV3/WW3 |
|---------|---------|---------|---------|
| 1       | 0.550000 | 0.540000 | 0.560000 |
|         | 1.000000 | 0.500000 | 0.500000 |

*REFRACTIVE INDICES

| SRF | GLASS | RN1 | RN2 | RN3 | VNBR | TCE |
|-----|-------|-----|-----|-----|------|-----|
| 0 | AIR | 1.000000 | 1.000000 | 1.000000 | -- | -- |
| 1 | BK7 | 1.518522 | 1.519039 | 1.518032 | 514.893671 | 71.000000 |
| 2 | AIR | 1.000000 | 1.000000 | 1.000000 | -- | 236.000000 |
| 3 | BK7 | 1.518522 | 1.519039 | 1.518032 | 514.893671 | 71.000000 |
| 4 | REFLECT | 1.518522 | 1.519039 | 1.518032 | 514.893671 | 236.000000 |
| 5 | BK7 | 1.518522 | 1.519039 | 1.518032 | 514.893671 | 71.000000 |
| 6 | REFLECT | 1.518522 | 1.519039 | 1.518032 | 514.893671 | 236.000000 |
| 7 | BK7 | 1.518522 | 1.519039 | 1.518032 | 514.893671 | 71.000000 |
| 8 | AIR | 1.000000 | 1.000000 | 1.000000 | -- | 236.000000 |
| 9 | SFL6 | 1.811859 | 1.813916 | 1.809929 | 203.639077 | 90.000000 |
| 10 | AIR | 1.000000 | 1.000000 | 1.000000 | -- | 236.000000 |
| 11 | BK7 | 1.518522 | 1.519039 | 1.518032 | 514.893671 | 71.000000 |
| 12 | AIR | 1.000000 | 1.000000 | 1.000000 | -- | 236.000000 |
| 13 | BK7 | 1.518522 | 1.519039 | 1.518032 | 514.893671 | 71.000000 |
| 14 | AIR | 1.000000 | 1.000000 | 1.000000 | -- | 236.000000 |
| 15 | BK7 | 1.518522 | 1.519039 | 1.518032 | 514.893671 | 71.000000 |
| 16 | AIR | 1.000000 | 1.000000 | 1.000000 | -- | 236.000000 |
| 17 | BK7 | 1.518522 | 1.519039 | 1.518032 | 514.893671 | 71.000000 |
| 18 | AIR | 1.000000 | 1.000000 | 1.000000 | -- | 236.000000 |
| 19 | BK7 | 1.518522 | 1.519039 | 1.518032 | 514.893671 | 71.000000 |
| 20 | AIR | 1.000000 | 1.000000 | 1.000000 | -- | 236.000000 |
| 21 | BK7 | 1.518522 | 1.519039 | 1.518032 | 514.893671 | 71.000000 |
| 22 | AIR | 1.000000 | 1.000000 | 1.000000 | -- | 236.000000 |
| 23 | IMAGE SURFACE | | | | | |

*OPERATING CONDITION: SYSTEM NOTES
NO DEFINED OPERATING CONDITIONS

ENHANCED NIGHT VISION DEVICE

RELATED APPLICATIONS

The present application is related to provisional application Ser. No. 60/123109 filed Mar. 5, 1999 entitled "ENHANCED NIGHT VISION DEVICE".

FIELD OF THE INVENTION

The present invention relates to night vision systems in general, and more particularly to night vision devices which can be mounted onto a viewers face or helmet via a housing assembly in a compact configuration and which provides a see-through capability for both day and night time viewing.

BACKGROUND OF THE INVENTION

For years, military personnel have used image intensifier night vision goggles (NVG) to conduct night operations. The majority of the fielded version of these NVGs comprise of objective lenses, image intensifier tubes and eyepieces usually assembled in a straight line. Thus, most prior art night vision goggles extend out in front of the user's face and normally block his/her forward view. An exception to this type of configuration is a fielded aviation goggle called Catseyes, in which the eyepiece has an offset and a see-through prism. This goggle, while not blocking the forward view of the user, still, however, extends out from the user's face. Another exception is a special use goggle for parachute operation called the Eagle Eye System, originally purchased by Canadian Armed Forces for Search and Rescue Technicians. This device uses folded see-through optics. While the folded optics presents a low profile NVG, the device sacrifices eye relief and range performance found in other fielded NVGs. The operation of each of these night vision goggles is similar. An objective lens collects light from a low illumination scene and focuses it onto a photocathode of an image intensifier tube. The image intensifier tube photocathode converts this image into an electronic signal which is amplified and reconverted into an intensified image on the image tube's screen. An eyepiece magnifies the image tube screen image for viewing by a user.

Since most NVGs used in the military extend out from the user's face, the military has been forced to modify their tactics at night. Individual soldiers can not perform their normal daylight movement techniques such as a low crawl, firing from a prone position or a quick forward rush and drop to the ground. This variation in tactics requires additional training. By design and limitation in technology, image intensifier tubes either shut off or operate with severely degraded resolution when the light level increases. Since the standard NVGs block the forward vision, users become blind when they are suddenly exposed to high light conditions. However, if an NVG were a "see-through" device, the user's normal eyesight would take over under high light conditions. For operations in urban areas, lack of a "see-through" capability represents a major shortcoming. Furthermore, lack of ballistic and laser protection (BLPs) forces soldiers to wear a BLPS behind the NVG, pushing it out so far that it reduces the intensified field of vision (FOV). The known prior art systems do not combine the performance characteristics and enhancements of the night vision visor system according to the present invention.

In further consideration of the optics associated with prior art devices, it is known that several devices use a single objective to image a scene on a single image intensifier, and split the output (ocular) side into two paths for each eye using mirrors or prisms. These devices include the U.S. Army's PVS-7 Binocular Night Vision Goggle, disclosed in U.S. Pat. No. 5,712,726, as well as the SIMRAD GN 1 Night Vision Compact Monocular Goggle for night time vision. Another prior art device is represented in U.S. Pat. No. 4,653,879 issued to Filipovich. In this patent, the night vision device images a scene onto two separate image intensifiers/ocular paths, using conventional optical lenses and beam combing prisms to fold the device into a compact structure. Another device is disclosed in U.S. Pat. Nos. 5,699,194 and 5,701,202, issued to Takahashi, which uses an aspheric beam combiner to directly superimpose an electronically generated scene onto a direct view scene. However, significant drawbacks associated with each of these systems exist, including the lack of one or more of the following features: low profile architecture (to user's head), direct view (see through) capability, low weight, peripheral direct view, interpupilliary adjustment, and a 40° field of view. Neither the PVS-7 device, nor the SIMRAD GN 1 device are see-through night vision devices. Furthermore, the GN 1 device lacks an interpupilliary adjustment, while the system disclosed in the Filipovich patent includes a limited field of view and a relatively heavy structure. The devices disclosed in the Takahashi patents includes two further difficulties. The Takahashi system uses total internal reflection, which can be obscured by contaminants or poor polishing and can not use diamond turning. Moreover, since it has only three surfaces to correct aberrations, its performance in obtaining both resolution and field of view is relatively poor.

Still further, most prior art systems fail to provide robust packaging, thereby permitting device and container breakage. Other shortcomings of prior art systems include the failure of such systems to provide a compact low profile device, excessive weight of such devices causing head/neck strain and fatigue problems and the lack of laser protection or ballistic protection from projectile fragments. In addition, the prior art device can not be used as an integrated sun, wind and dust protective visor and fails to provide a full 40 degree field of view to the user. Prior art systems have also failed to incorporate a forward-looking photo transistor to turn the system off in sufficiently lighted areas, as well as a forward projecting infrared light emitting diode for additional illumination in completely dark areas, in addition to a user adjustable image intensifier variable gain capability. The above shortcomings of the prior art devices, which also include failure to optimize objective lens locations for addressing stereopsis and failure to provide means of secondary image input, would make a night vision device which incorporates such features highly desirable.

The night vision device according to the present invention provides many system enhancements over the previously designed systems. Such enhancements include a system housing constructed from lightweight composite materials helping to reduce head/neck fatigue; and a very compact and low profile structure optimizing the center of gravity, to further reduce head/neck fatigue. The device according to the present invention further includes a forward projecting infrared light emitting diode (IRLED) for additional illumination in completely dark areas; and an enclosed face mask type housing which provides sun, wind, and dust protection. A front visor attached to the mask housing provides various levels of environmental protection, including both laser and ballistic protection.

The system is designed to remain compatible with usage of the PASGT helmet and incorporates a user adjustable image intensifier variable gain capability, provides for secondary image input for direct view or electronic read out sensors, and provides full 40 degree field of view. The system of the present invention also optimizes objective lens location, thereby minimizing effects of stereopsis, and utilizes an image intensifier tube that is smaller in size with minimal reduction in active diameter relative to the prior art tube in use in the AN/PVS-7 system.

The small tube size allows smaller system package and folded optics to provide see-through capability. The smaller components and folded optics form a low profile system which minimizes the chance of the device being caught on branches, tree limbs and the like.

The night vision visor system according to the present invention achieves the features of low profile architecture, direct view, low weight, peripheral direct view, interpupilliary adjustment and 40° field of view by utilizing a low density (specific gravity 1.1) plastic multi-aspheric beam combiner which has internal surface with optical power. The optical power reduces the size of the internal light beam so that the beam combiner can have a depth of less than 40 mm, as compared to 70 mm with conventional glass beam combiner. The beam combiner also allows the direct viewing of visible scenes simultaneously with viewing of the same scene in the infrared. Furthermore, a relay lens with tilted components images the light which passes through the beam combiner with the correct amount of distortion and other image aberrations to cancel the distortions and other aberration inherent in a plastic multi-aspheric beam combiner.

SUMMARY OF THE INVENTION

A night vision device comprising a facemask housing assembly having a peripheral surface defined by a rear surface contoured to a user's face and an open front surface, the housing assembly operative for encasing a pair of optical assemblies, the optical assemblies operative for receiving light from a viewed object via a first folded optical path and via a second direct optical path, combining the light from the first and second paths, and directing the combined light to a user's eye for viewing the object; each optical assembly detachably coupled to the housing assembly, wherein each optical assembly comprises an objective lens assembly for receiving and focusing visible and infrared light from a viewed object along the first folded optical path; image intensifier means responsive to the focused light from the objective lens assembly for converting the visible and infrared light to visible intensified light; and beam combining means responsive to the visible intensified light and to the direct path light for combining with one another and directing the combination to the user's eye for viewing.

There is also disclosed a housing assembly for use with a night vision device for accommodating a pair of optical assemblies each associated with a respective eye comprising a frame contoured to engage a user's face and having an open front portion for receiving a transparent visor to enable direct view of an object; and a chassis within an interior surface of the frame for detachably coupling a respective one of the optical assemblies to the frame.

It is a further object of the present invention to provide in an imaging apparatus wherein an image of a viewed object is displayed to a user's eye, a compact, lightweight objective assembly for receiving and focusing light from the viewed object along a folded optical path, comprising an objective lens system comprising a plurality of lenses operable for receiving and transmitting light incident thereon from the viewed object and focusing the light at a predetermined focal length in a focal plane; and a prism having an input surface responsive to the focused light output from the objective lens system, the prism operative to alter the path of the focused light at an output surface predetermined angle relative to the focused light output from the objective lens system, thereby defining the folded optical path, the prism operative to provide focused light representative of an image of the viewed object along the folded optical path.

Still further, there is disclosed an ocular assembly for use in an imaging apparatus comprising a relay lens assembly having an input surface for receiving light representative of a viewed object along a first optical path and imaging the received light onto a multi aspheric beam combiner; the multi aspheric beam combiner operative for receiving light from the viewed object along a second optical path and combining with the light from the first optical path to provide an image to a user's eye corresponding to the superposition of light from the first and second optical path and indicative of the viewed object; and a right angle prism disposed between the relay lens assembly and said multi aspheric beam combiner for folding the light imaged from the relay lens onto the multi aspheric beam combiner in a direction substantially perpendicular to the direction of orientation of the light incident at the input surface of the relay lens assembly.

BRIEF DESCRIPTION OF THE DRAWINGS

For the purpose of facilitating and understanding of the invention, there are illustrated in the accompanying drawings preferred embodiments thereof, from an inspection of which, when considered in connection with the following description, the invention, its construction and operation, and many of its advantages should be readily understood and appreciated.

FIG. 2 is a front perspective view of the visor system of FIG. 1;

FIG. 10A–10D includes the surface details of the objective assembly;

FIG. 11A–11C includes the surface details of the ocular assembly.

DETAILED DESCRIPTION OF THE INVENTION

Figure 1:
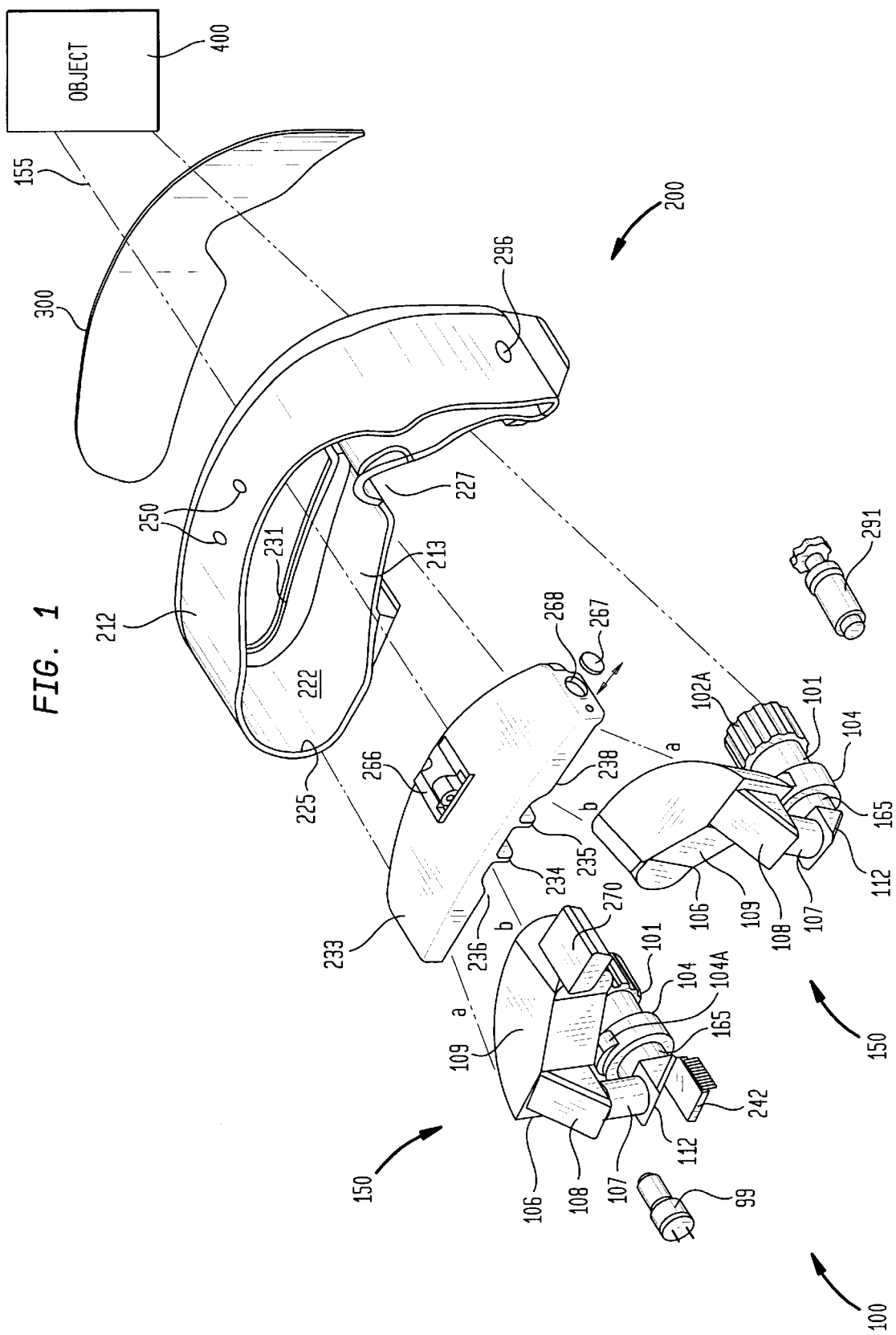
FIG. 1 is a schematic illustration of the enhanced night vision visor device according to the present invention.

Referring now to FIG. 1, there is illustrated an exploded view of a compact night vision visor system 100 according to an embodiment of the present invention which includes a housing assembly 200 for receiving and encompassing a pair of optical assemblies 150 arranged for respectively accommodating the left and right eye of a viewer, where the optical assemblies are constructed as mirror images of each other. Note that when referring to the drawings, like reference numerals are used to indicate like parts. Each optical assembly 150 includes an objective assembly 101 comprising an objective lens and preferably a roof prism, an image intensifier 104 for converting infrared scene light/image at an input face or surface proximal to the objective lens into a one-to-one mapping of visible scene light/image at an output face. In the preferred embodiment, the image intensifier has an active surface diameter of substantially 16 mm. Note that FIG. 1 provides an exploded rear perspective view of the visor system 100, while FIG. 2 illustrates generally an exploded front perspective of the visor system according to the present invention.

As shown in FIGS. 1 and 2, the image intensifier is coupled between the objective lens assembly 101 and an ocular assembly 106, which comprises a beam combiner assembly 109, relay lens 107, right angle prism 108, and cube prism beam splitter 112. Fiber optic bundle 165 having a radius that matches the field curvature of the ocular assembly 106 is coupled between the image intensifier and the ocular assembly. Each optical assembly 150 comprises folded optics to provide 20 mm of eye relief, as well as unobstructed see-through capability. The system includes a high performance objective lens having a high aperture (F/1.2) and a 40° field of view operative with a high resolution (64 LP/mm) with a linear friction focus adjustment. The use of a folded optical system allows the night vision apparatus 100 to be low profile and compact, thereby minimizing head and neck fatigue to the user or wearer. The optical assembly is configured within the interior of housing 200 such that light rays representing an image of an object 400 may be received and viewed via direct path 155 through the housing assembly and onto the eyepiece of ocular assembly 106 as well as via the folded optical path of the objective assembly 101, image intensifier 104 and ocular assembly 106.

Referring collectively to FIGS. 1 and 2, the housing assembly 200 is a monolithic unit which comprises a lightweight composite non-metallic material that is approximately 25% carbon filled. The housing provides ballistic protection including protection from projectile fragments, as well as environmental protection from tree limbs, vines, debris and so on. The housing 200 has an open front surface portion 210 defined by peripheral surface 212 having a width of substantially 50 mm and arranged in a substantially elliptical configuration. The width of surface 212 (and opposing surface 222) is substantially uniform and operable for encasing the pair of optical assemblies within the interior of the housing. The bottom portion 213 of peripheral surface 212 is formed of a suitable transparent material (e.g. a polycarbonate) to provide a viewer with the capability to look in a downward direction from each eye through the transparent window 213, thereby increasing the user's field of view. Preferably, this material is polyetherimide (PEI) characterized by high heat resistance, high strength and modulus, and excellent electrical properties which remain stable over a wide range of temperatures and frequencies. Unmodified PEI is transparent and has inherent flame resistance and low smoke evolution. The rear edge 225 of peripheral surface 212 is provided with a face cushion 228 made of suitable resilient material such as foam rubber or the like. The face cushion extends substantially the entire perimeter of the rear edge of the facemask housing and is contoured for fitting/sealing to the user's face. Cavity portion 227 is adapted to conform to the bridge of the wearer's nose. A head strap (not shown) may be used to interconnect the rear ends or edges of the housing via connecting means such as oppositely disposed through holes 296 for mounting the visor system housing assembly onto a viewer's head in a standard fashion.

Figure 3A:
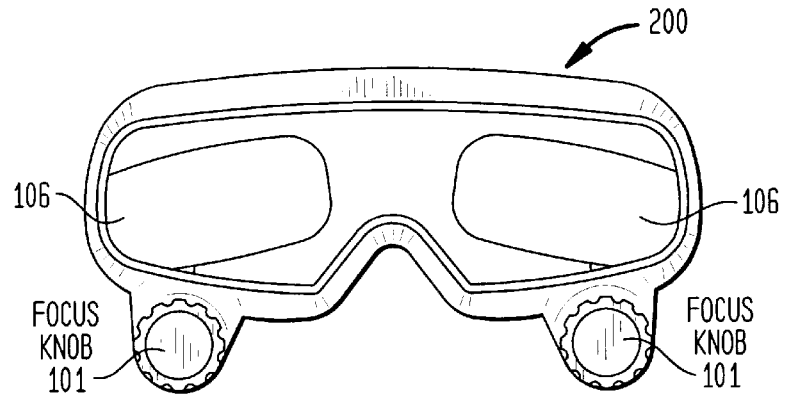
FIG. 3A–C illustrate front binocular and monocular use of the enhanced night vision visor device of the present invention.
Figure 3B:
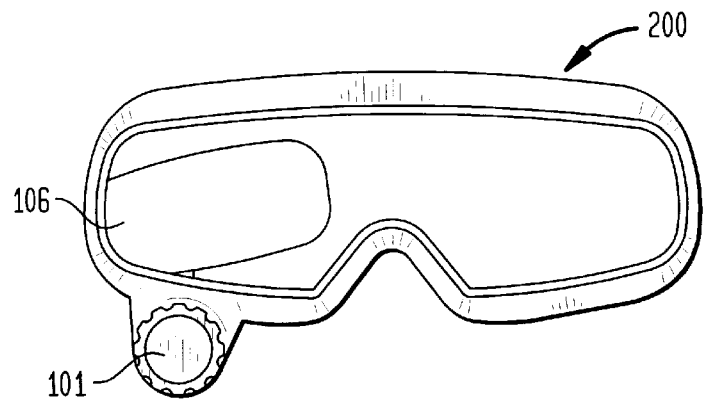
Figure 3C:
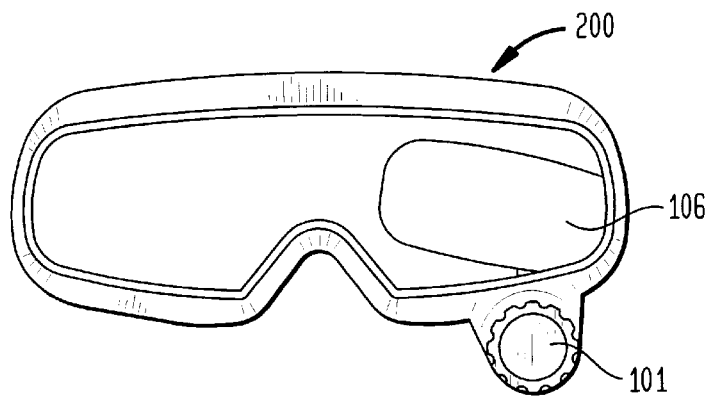

As best shown in FIGS. 1 and 3 A–C, each optical assembly 150 may be detachably coupled to the interior surface 222 of the housing at a position such that the assembly does not block the viewing via the transparent window 213. A chassis 233 is coupled to the upper portion of interior surface 222 opposite peripheral surface 212 of the face mask housing and operative for coupling the optical assembly 150 to housing 200. As one can ascertain, chassis 233 comprises a substantially planar top surface and a grooved bottom surface adapted to accommodate and secure each of the respective left and right optical assemblies at the top portions thereof along chassis portions 236 and 238 respectively, as represented by dashed lines a-b. The grooved bottom surface also includes wall portions 234 and 235 defining a cavity there between for receiving and securing electronic module 270. Preferably, the chassis is molded into the upper interior portion of the housing 200, so that the optical assemblies 150 may slidably engage and be retained via the chassis within the housing. The optical assemblies 150 may then be snap fit into the chassis and may be extracted from the chassis by a rearward force onto a respective assembly. In an alternate embodiment, the chassis may be coupled to the interior of the housing via holes formed on the housing surface and corresponding holes on the top surface of chassis 233 for receiving bolts and/or screws in order to securely connect the chassis to the interior of the housing. The chassis 233 may also include a fore/aft adjustment mechanism 266 of well known type disposed on the top surface of the chassis for causing fore/aft movement of the chassis optical assemblies to fine tune the optical alignment to the user. The housing further includes a provision for optical adjustments to accommodate interpupilliary adjustments from a range of 51 mm to 73 mm located on the chassis. This is accomplished via shaft 267 disposed laterally on both sides of chassis 233 in hole 268 and having a knob which drives laterally in and out and which engages the corresponding optical assembly to cause corresponding interpupilliary adjustment. Preferably, the chassis is made of the same carbon filled material as the rest of the housing (absent the transparent window portions). The housing may also include a pair of contact points 250 disposed preferably on a top portion of peripheral surface 212 to enable electrical contact for a helmet-mounted configuration. The contacts are electrically connected to the optical assembly 150 in a known manner to provide electrical power and electrical communication with the helmet. This provides a mechanism for tilt adjustment in a head/helmet mounted configuration.

A visor lens 300 (see FIGS. 1, 2) may be attached to the open front portion 210 of the mask housing 200 so that the front of the mask is completely sealed. The visor feature provides levels of laser protection, as well as protection from the sun, wind, and dust. The visor lens 300 also provides ballistic protection against fragments of up to 5.8 mm. Preferably, the visor lens comprises a polycarbonate material having a spherical geometry and is approximately 2 mm thick. In a preferred embodiment, the visor lens is snap fit into groove 231, which extends entirely along the front perimeter of housing 200. The visor lens is adapted to provide environmental protection while still permitting light rays to enter the front portion of the housing.

Figure 4A:
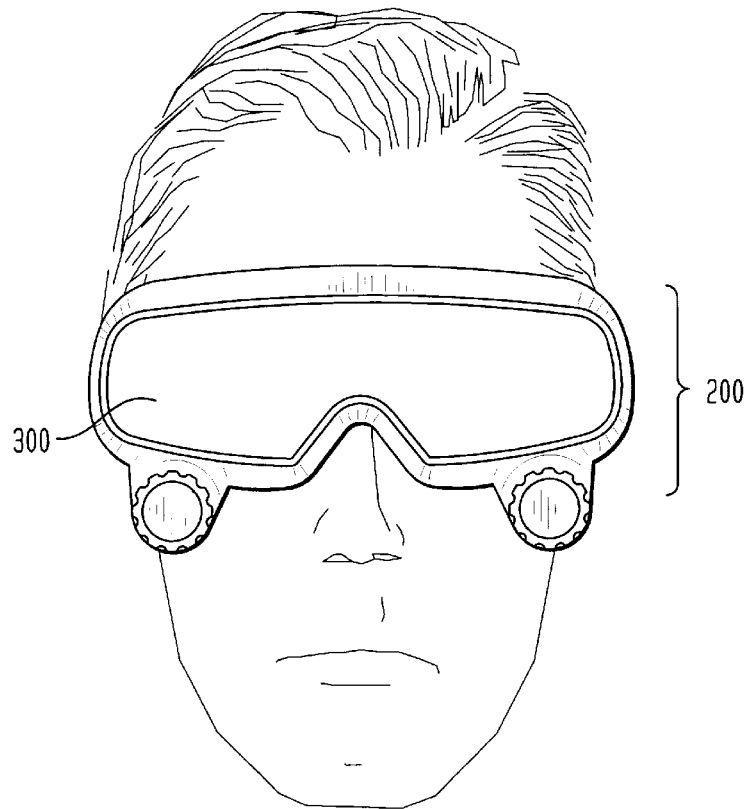
FIG. 4A–B show front and rear views of the housing configuration of the enhanced night vision visor device of the present invention absent the optical assemblies.
Figure 4B:
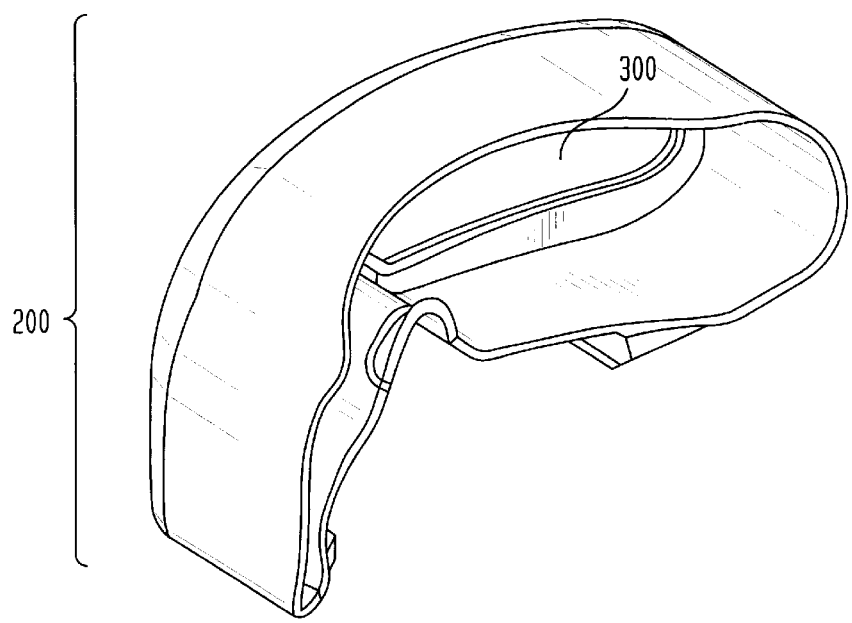

Referring again to FIGS. 3A–C, the night vision system of the present invention is designed to be a modular system which allows both binocular use or left/right monocular use. This permits the user to choose his or her own preference for left eye, right eye or both eye use. If a user desires, both optical assemblies 150, may be detached from the housing as previously described, thereby providing a stand-alone sun, wind and dust visor that still provides ballistic and laser protection. Such a configuration where the optical assemblies have been removed is illustrated in FIGS. 4A and 4B.

Referring again to FIG. 2, the image intensifier is preferably a compact 16 mm image intensifier tube that provides the capability for the tube gain to be varied by the user. This is accomplished through an externally mounted adjustable potentiometer (not shown). An external gain control knob 99 electrically coupled to the image intensifier via conventional means allows the user to variably adjust the gain of the intensifier tube to the desired level for optimal performance. Wire leads output from the top portion of the image intensifier tube (ref. numeral 104A of FIG. 1) provide electrical communication of the tube with the rest of the electronics in the night vision device.

Still referring to FIG. 2, two clear circular windows are positioned on a front face of electronic module 270 which is coupled to the upper interior surface of housing 200 via chassis 233 (see FIG. 1). These windows align with infrared LED 272A (IRLED) and phototransistor 272B when assembled into the housing. The IRLED 272A is activated by on/off/IR switch 291 via the electronics housed in chassis 233 to provide forward projecting light for additional illumination. This is particularly useful for operations conducted in virtually total darkness. Phototransistor 272B is operable to sense light intensity incident onto its window indicative of daylight or sunlight, and in response to sensing an amount of light intensity exceeding a predetermined threshold, the phototransistor operates via the electronics within the housing to turn off the night vision apparatus, thus protecting the image tube from burn-in. Phototransistor 272B is operable to provide a signal indicative of the amount of sunlight detected at the phototransistor to a sensor circuit on the electronic control board. The sensor circuit then compares the received signal with the predetermined threshold value. If the signal exceeds the threshold value, the sensor circuit operates to terminate power or turn off the intensifier tube, thereby protecting the image tube and extending the life of the device. Note that switch 291 provides the following controls: OFF/SYSTEM ON/MOMENTARY IR ON/LOCKED IR ON. Further description of the operation of such a unit is described in co-pending commonly assigned U.S. patent application Ser. No. 09/074,238 entitled "Improved Monocular night Vision Device" and incorporated herein by reference.

When the switch is positioned to SYSTEM ON mode, the image intensifier tube is operational; however, the IR capability is non-functional in this mode. The switch is preferably spring loaded, such that turning of the switch knob 291 in the direction opposite the direction for SYSTEM ON mode, activates the MOMENTARY IR ON mode to permit IR signaling. In this manner, one may use the MOMENTARY IR ON mode to send Morris code or other signaling in a covert manner. LOCKED IR ON mode provides continuous IR features and is enabled by pulling the switch knob towards the user and turning in a clockwise manner to allow engagement of this mode.

The night vision system according to the present invention is designed to minimize, if not eliminate stereopsis, a condition of monocular depth perception which results from binocular parallax, where each eye sees a different view of the objects. Such phenomena is created by the horizontal separation of the two eyes (i.e. interpupilliary distance) due to the distance and relationship of the objective to the eye. Furthermore, as will be described in detail later, a provision for electronic interface for symbology may be inserted into an optical path to allow various data to be viewed and overlayed in a heads-up display (HUD) fashion. Furthermore, compatibility with other soldier systems such as thermal weapon site, as well an integration with day/night video cameras is also possible.

As previously mentioned, the night vision apparatus 100 as shown in FIGS. 1 and 2, is designed with many system enhancements over prior art systems. The apparatus 100, is compact, lightweight, and comfortable to wear and a can be worn on the head as a face mask, head mounted or helmet mounted. The apparatus 100 may also be used as a hand held device as well, as it is a modular system providing a wide variety of configurations tailored to the specific requirements of a user. When the system is worn on the head in a mask-like fashion, it may be held securely via an elastic band with an integrated suspension system to provide the user with comfort, while reducing head and neck fatigue during periods of long usage.

As previously mentioned, an adapter may be connected to the night vision apparatus at connection points 250 to provide a head mounted configuration. In this configuration, the night vision device allows for flip-up/flip-down and fore/aft adjustment. In still another configuration, an adaptor for mounting the system to a soldier's helmet such as a PASGT helmet (get acronym for PASGT) may be utilized which allows for both flip-up/flip-down and fore/aft adjustment of the night vision device. In addition, the foam seal 228 (see FIG. 1) around the peripheral interior portion of the mask housing 200 is detachable so as to allow removal of the seal to provide adequate ventilation and increased peripheral viewing, if desired. When worn in the mask configuration, or the head mount configuration, the apparatus remains compatible with the PASGT helmet worn on the head. Furthermore, the ergonomic shape and compactness of the design do not interfere with the helmet brim.

Figure 5A:
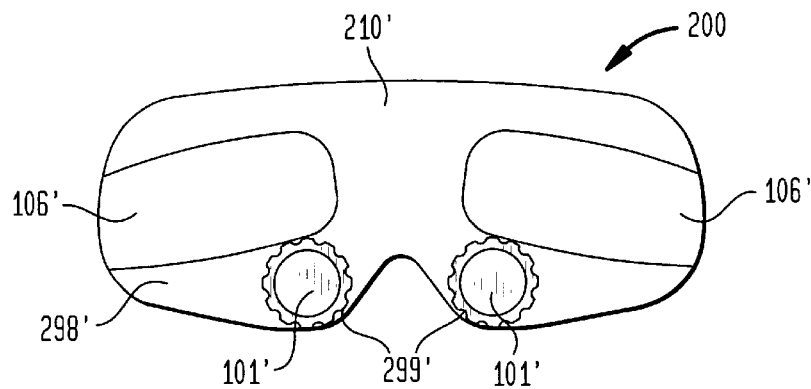
FIGS. 5A–5D represent front, bottom, rear, and top schematic views respectively of the enhanced night vision visor device housing and optical assembly according to another embodiment of the present invention.

Referring now to FIG. 5A there is shown an alternative embodiment of the housing and optical assemblies according to the present invention, where a recessed portion 298' included within the front portion 210' of the housing 200' includes through holes 299' for accommodating each of the corresponding objective lens assemblies 101' so as to both guide and secure the objective lenses within the lower portion 298' of the housing. As one can ascertain, FIG. 5A represents a front view of the housing and optical assemblies similar to that illustrated in FIG. 3A.

Figure 5B:
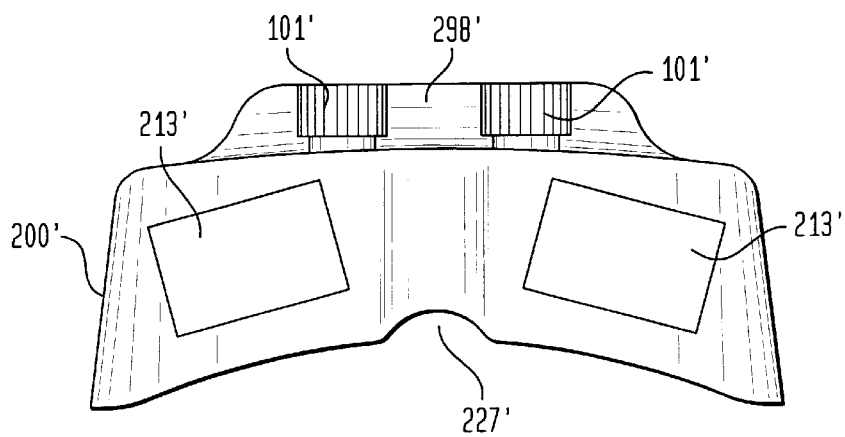

FIG. 5B shows a bottom view of the housing according to FIG. 5A. As shown in FIG. 5B a pair of transparent windows 213' are separated a predetermined distance from one another so as to correspond to the associated position of a respective left and right eye when the user's head is placed within the housing 200'. This enables one to look downward through each of the corresponding transparent windows.

Figure 5C:
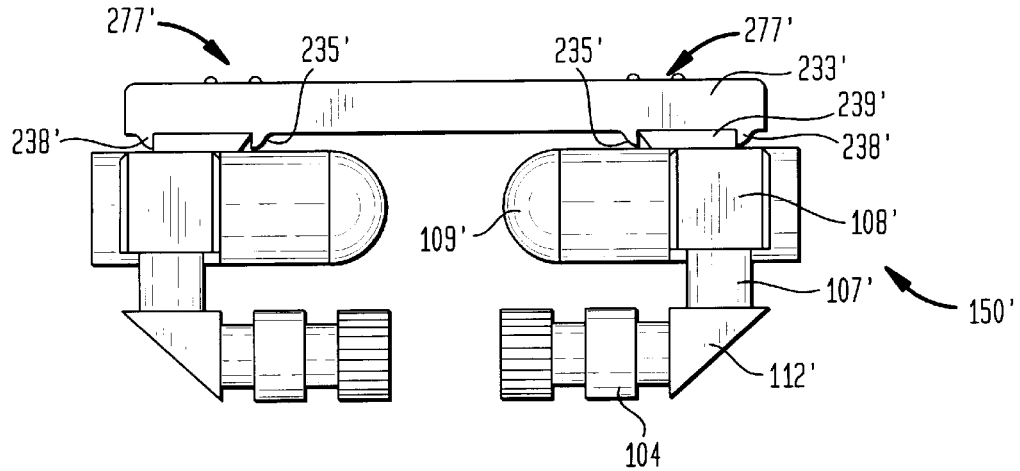

FIG. 5C represents a rear interior view of the housing assembly of FIGS. 5A and 5B which illustrate the connection of the chassis with the optical assemblies 150'. As schematically illustrated in FIG. 5C, chassis 233' includes guide members 235' and 238 ' for receiving connecting member 239' attached to optical assembly 150'. Guide member 239' coats with and slidingly engages interior ridges formed within members 235' and 238' to allow slidable insertion of the optical assemblies into the chassis. Alternatively, the optical assemblies may also be snap-fit into the chassis. The chassis is then coupled to the upper interior of the housing via securing members 277' oppositely disposed from one another on the top surface of the chassis and may include cavities for receiving a corresponding screw for attaching to the interior of the housing. As one can ascertain, the optical assemblies 150' include each of the same functional optical elements as previously discussed including image intensifier 104', cube prism 112', relay lens 107' and right angle prism 108' in addition to the ocular 109'.

Figure 5D:
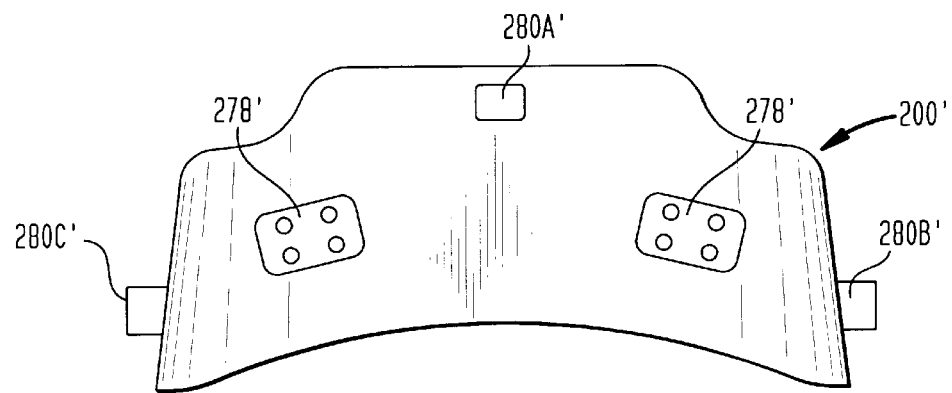

FIG. 5D shows a schematic top front view diagram of the housing 200' illustrating the areas 278' to which screws would engage corresponding screw holes 277' on chassis 233' (see FIG. 5C). Top portion FIG. 5D also shows connecting elements 280A', 280B', and 280C' for connecting with a strap (not shown) for use in a head-mounted configuration. Elements 280A', 280B', and 280C' are preferably snap fixtures secured to the housing 200' to enable snap-fit connections with the corresponding strap.

Figure 6:
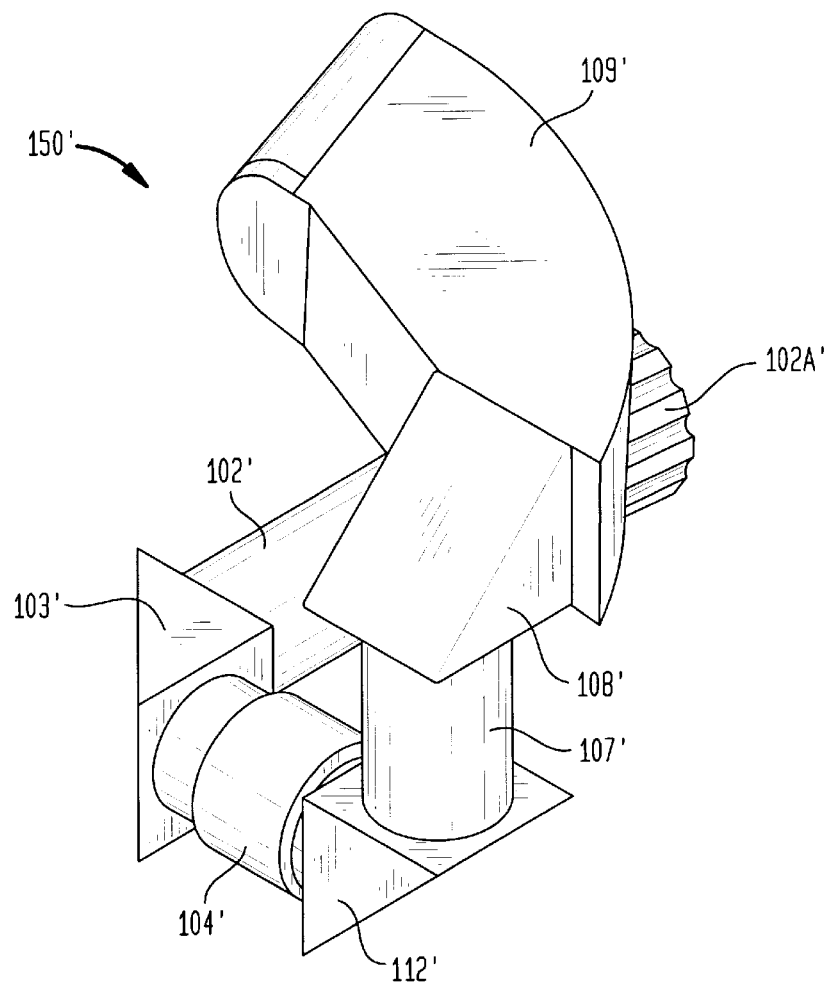
FIG. 6 represents a schematic perspective view of the optical assembly illustrating a different orientation of the assembly from that of FIG. 1 according to another embodiment of the present invention.

FIG. 6 illustrates a perspective view of the optical assembly 150' illustrating each of the optical components associated with the objective lens assembly and ocular lens assemblies. As shown in FIG. 6 (as opposed to the embodiment in FIG. 1), the image intensifier is disposed at a substantially right angle from the objective lens and extends in a substantially outward (i.e. horizontal) direction. The cube prism 112' again folds the light output from the image intensifier and transmits through relay lens 107' the image into right angle prism 108'. The light rays propagate through relay lens 107' which is substantially in parallel alignment with the objective lens 102', such that the light passing therethrough is propagating in a substantially forward direction (i.e. forward with respect to the housing). The right angle prism 108' again folds the light such that it enters the ocular 109' which is disposed substantially over the input 102A' of the objective lens.

Figure 7A:
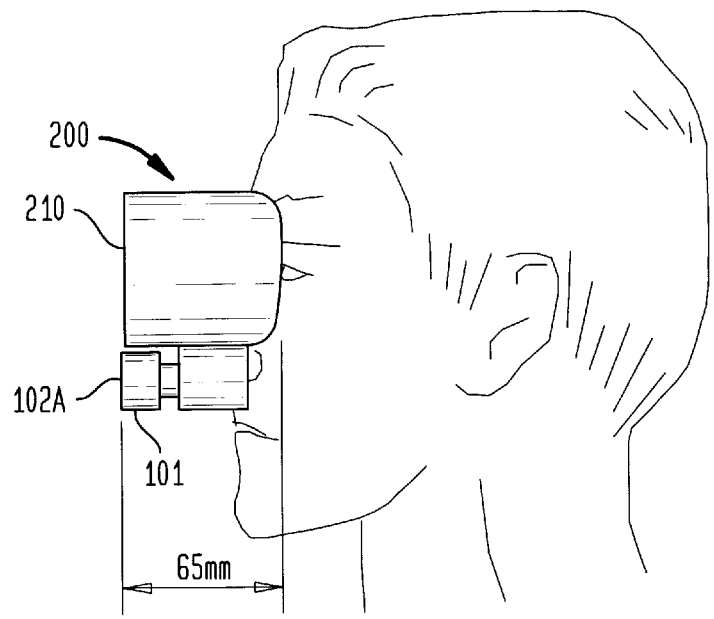
FIG. 7A illustrates a profile view of the enhanced night vision visor device of the present invention.
Figure 7B:
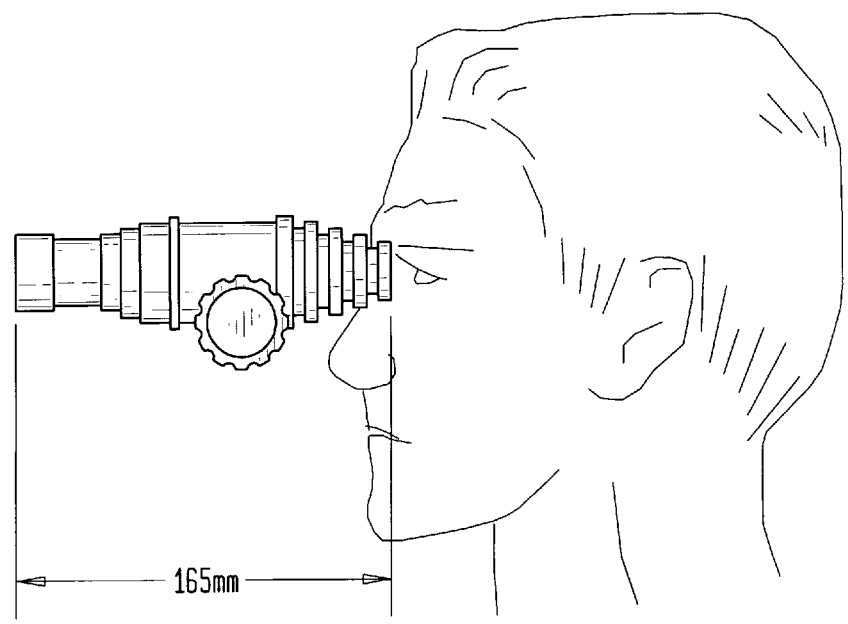
FIG. 7B illustrates a profile view of a prior art night vision system.

Referring now to FIG. 7A, there is shown a profile view of the enhanced night vision visor device according to the present invention. As shown in FIG. 7A, the fore/aft length of the night vision system 100 is approximately 65 mm. This is achieved through the use of folded optics within the objective assembly 101 and ocular assembly 106 arrangement, thereby providing a compact, lightweight, low-profile device. As illustrated, the objective assembly 101 extends beneath bottom portion 213 of housing 200 such that the input 102A to the lens assembly 102 is substantially coplanar with front portion 210 of housing 200. Such a configuration is in contrast to the prior art depicted in FIG. 7B, which provides fore/aft depth of approximately 165 mm.

Figure 8A:
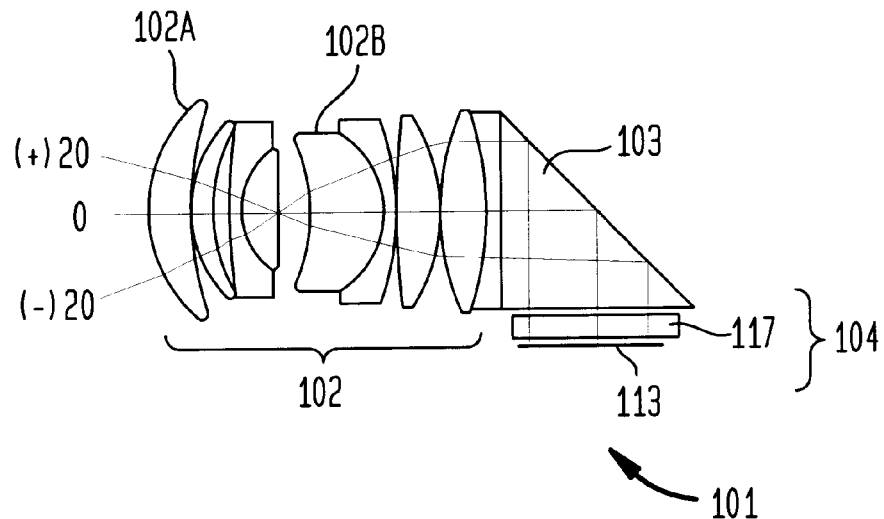
FIG. 8A illustrates a ray diagram of light rays entering and passing through an objective assembly used in the enhanced night vision visor device of the present invention.
Figure 8B:
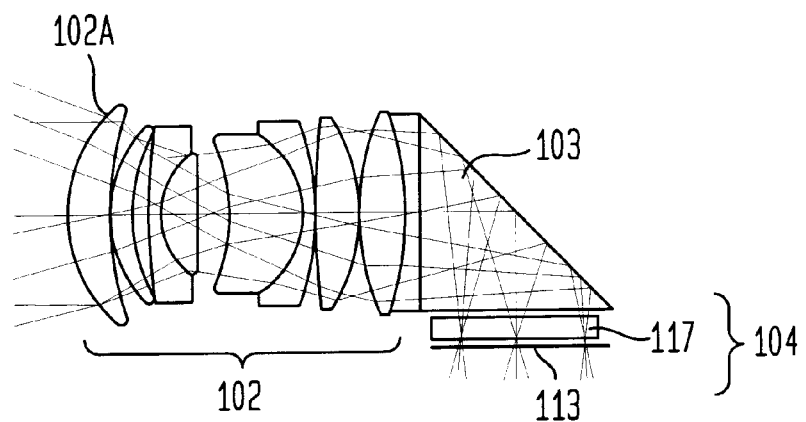
FIG. 8B illustrates an unfolded view of the light rays passing through the objective assembly of FIG. 8A.

Referring now to FIG. 8A, there is depicted a detailed view of the objective assembly 101 of one of the pair of optical assemblies 150 of the night vision visor system according to the present invention. The objective assembly 101 consists of an objective lens system 102 and roof prism 103. In the preferred embodiment, the objective lens system 102 is movable to allow focusing, while the roof prism is stationary within the housing. As one can ascertain, the objective lens system utilizes a refractive element (doublet 102B) but does not utilize a collimator. FIG. 8A illustrates three light rays at +20, 0, and −20° field of view which pass through the objective lens system 102, are inverted and reversed by the roof prism 103, pass through the image intensifier window 117 and enter the input face 113 of image intensifier 104. FIG. 8B is an unfolded version of FIG. 8A showing how the three bundles of light rays (+20, 0, and −20° field of view) pass through the objective assembly. The objective assembly is designed to have a distortion equal and opposite to the distortion of the ocular assembly 106 (see FIGS. 1, 9A) in order to eliminate undesirable wiggles and waviness in the image, which is supplied to the user's eye. The objective assembly has a high aperture of F/1.2, a field of view of substantially 40°, and thereby provides improved optical performance. The objective lens system 102 comprises a plurality of conventional spherical lenses, typically made of glass. In general, seven or more glass, conventional spherical lenses are used to form the objective lens system.

Figure 9A:
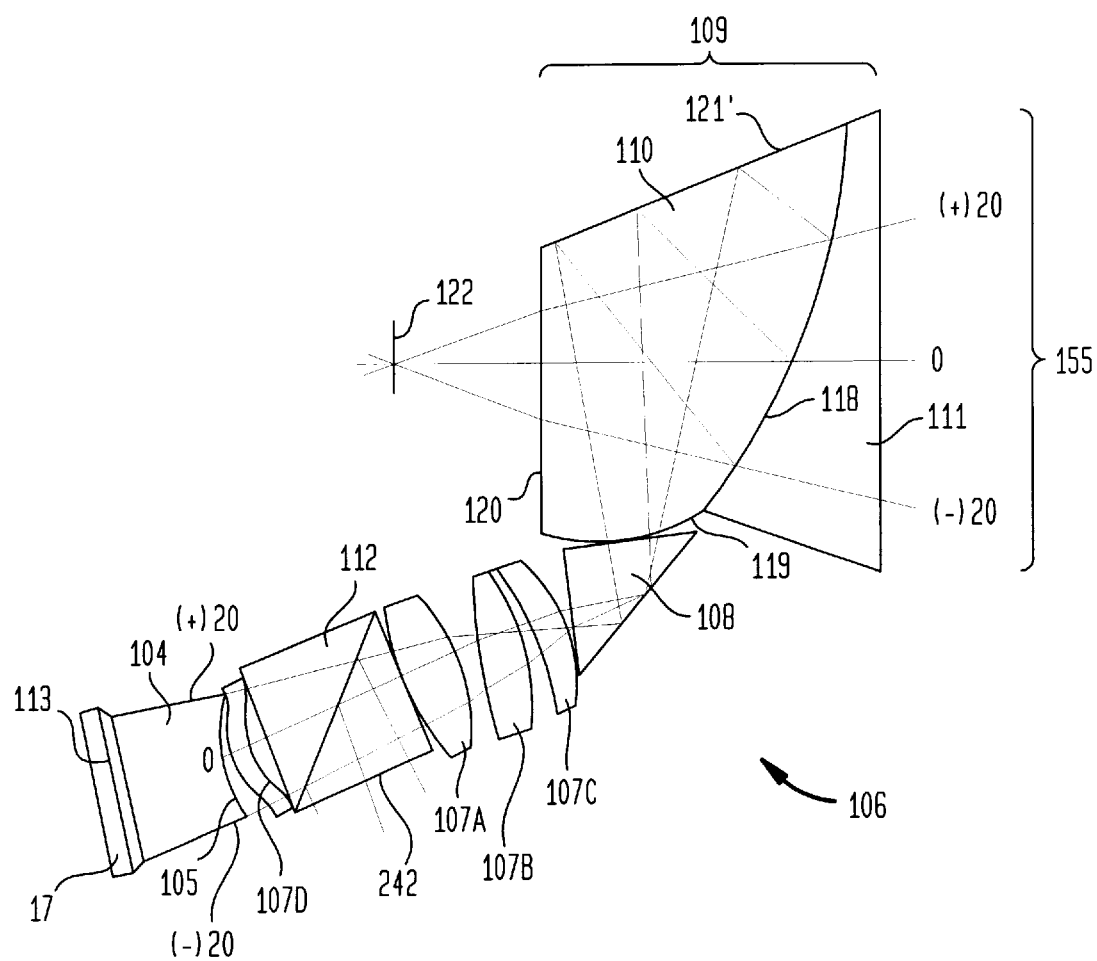
FIG. 9A illustrates a ray diagram of light rays entering and passing through an ocular assembly used in the enhanced night vision visor device of the present invention.

As shown in FIG. 8A, the objective lens images infrared light rays into the input face 113 of the image intensifier 104 (FIG. 9A). Note that unlike the prior art, objective lens system 102 should not be plastic or diamond turned due to problems of veiling glare caused by localized bubbles within the lenses, inclusions, and periodic roughness grooves. However, if veiling glare is ignored, then plastics and diamond turning may be used. The objective lens system 102 is designed with an amount of spherical aberration appropriate to compensate for aberration introduced by the roof prism 103 and the glass window 117 of the image intensifier 104.

Still referring to FIG. 8A, the roof prism 103 is, in the preferred embodiment, a right angle, unsymmetrical roof prism positioned near the focus of the objective lens assembly 102 and operative for folding the light beam ninety degrees (90°) and rotating the image up to 90°. The roof prism may be oriented so that an angle of less than 90° may be selected to compensate for tilting of the system back toward the face of the user so that the visor system is contoured to, or "hugs" the face. Note that the night vision device of the present invention has a 40 degree field of view (FOV) since this is the FOV of the objective lens. Note also that the housing masks itself has a 120 degree FOV.

The specific construction of the preferred embodiment of the objective assembly 101, of the present invention is described by referring to FIG. 8A in combination with the below-referenced FIG. 10A–10D. As one skilled in the art can ascertain, FIG. 10A–10D includes the surface details of the objective assembly including lens data, radius data, thickness, aperture radius, wavelength data, refractive indices data, and general operating condition data for the overall arrangement of the objective lens assembly.

The image intensifier 104 illustrated in FIGS. 8A and 9A operates to convert infrared light/images at its input face 13 into a one-to-one mapping of visible light/images at its output face 105. In the preferred embodiment, the image intensifier 104 has an active surface diameter of 16 mm. This, together with its electronics, makes the device significantly smaller than conventional image intensifiers. Referring now to FIG. 9A, the output face 105 operates as the exit surface to a fiber optic bundle 165 having a radius that matches the field curvature of the ocular assembly 106. As a result, a fiber optic twist is unnecessary and hence, the need and expense of such fiber optic twist design is eliminated. However, the adaptability of the present system such that the present system may be easily modified to use a fiber optic twist if desirable. The fiber optic bundle 165 may be eliminated by adding a negative lens to relay lens 107 or by placing a negative field flattening lens at the output face 105. The output face 105 would then become a glass substrate.

The ocular assembly 106 depicted in FIG. 9A, comprises a beam combiner assembly 109, relay lens 107, a right angle prism 108, and a cube-prism beam splitter 112. As will be described in greater detail below, the beam combiner assembly includes an ocular relay prism 110 for receiving intensified light originating from the objective assembly via intensifier 104 and prism 108, and a direct view prism 111 for receiving light from the object via a direct path 155 for combining with the light received from the objective assembly. The specific construction of the preferred embodiment of the ocular assembly 106, of the present invention is described by referring to FIG. 9A in combination with the below-referenced FIG. 11A–11C. As one skilled in the art can ascertain, FIG. 11A–11C includes the surface details of the ocular assembly including lens data, radius data, thickness, aperture radius, wavelength data, refractive indices data, and general operating condition data for the overall arrangement of the ocular lens assembly. The fiber optic bundle 165 may be eliminated by adding a negative lens to relay lens 107 or by placing a negative field flattening lens at the output face 105. The output face 105 would then become a glass substrate.

Still referring to FIG. 9A, the detailed design associated with the ocular assembly 106 of optical assembly 150 will now be described. FIG. 9A illustrates three light rays which, in the preferred embodiment, are visible (i.e. green) light rays at +20, 0, and −20° field of view emanating from the output face 105 of the image intensifier 104. The light passes through the first element 107D of relay lens 107 into cube-prism beam splitter 112 which operates to also receive light input from at least one other source 242. Both the light beams from the operative image intensifier 104 and from source 242 continue through beam splitter 112 through the next three lenses 107A, B, C of relay lens 107 and are incident onto the right angle prism 108, where they are folded 90°. That is, the right angle prism 108 operates to receive the light rays output from the relay lens 107 and directs the light 90° between the relay lens and the ocular relay prism 110 of the beam combiner assembly, such that the relay may be packaged along a viewer's cheek and parallel to the nose. Note that for ease of illustration, the raypaths of FIG. 9A are shown in the plane of the page. However, in reality the paths are perpendicular to the page. In this manner, the relay lens 107 operates to image the visible green light from the output face of the image intensifier into the beam combiner assembly 109. Sufficient aberration or optical distortion is selected within the relay lens parameters for imaging a 40° circular field of view on a 16 mm diameter image intensifier image plane. The distribution of distortion and field curvature between 0° and +/−20° field of view is designed to eliminate undesirable wiggles of waviness in the image supplied by the image intensifier. That is, the relay lens is designed to contain aberrations sufficient to compensate for the aberrations introduced by the right angle prism 108, the cube prism beam splitter 112, and the glass window 117 of the image intensifier 104. The relay lens is tilted to compensate for the distortion caused by the non-symmetrical nature of the beam combiner assembly. Note, however, that if non-symmetrical surfaces are used in the beam combiner assembly, such lens tilts in the relay lens may be eliminated.

In the preferred embodiment, the relay lens 107 includes three plastic, aspheric lenses 107A, B, C and one glass conventional spherical lens 107D. The cube prism beam splitter 112 operates to allow the insertion of symbology or additional scene information from source 242. Such source may be a charge coupled device (CCD) electronic circuit as illustrated in FIG. 1. Such source may also include a computer, mapping information, television, or other sources into the ocular assembly such that the eye 122 is able to view a third source of information in addition to the intensified infrared image scene and a direct view scene.

Figure 9B:
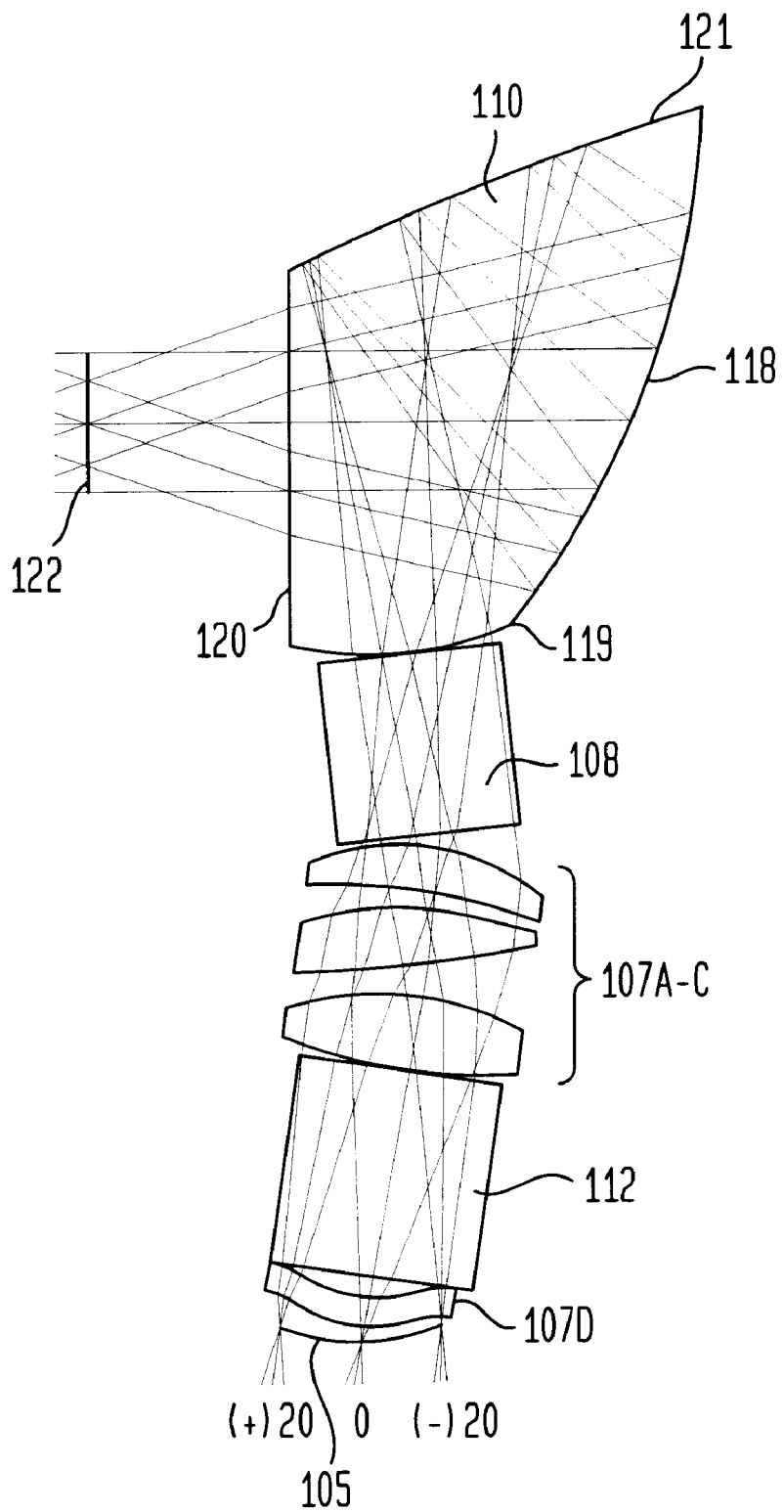
FIG. 9B illustrates an unfolded view of the light rays passing through the ocular assembly of FIG. 9A.

Upon exiting right angle prism 108, the light rays then operate to pass through aspheric input window 119 of ocular relay prism 110 and engage an aspheric reflective surface 121. The rays are reflected from surface 121 onto aspheric beam combiner surface 118, which is partially reflected based on the wavelength of the light. Preferably, the aspheric beam combiner surface 118 reflects the green light incident upon it, so that surface 118 reflects such light onto surface 120 which acts as an exit window for entry into the eye 122. A direct view path 155 illustrates three visible rays of +20, 0, and −20° field of view, which are incident upon and pass through the direct view prism 111, onto and through the aspheric beam combiner surface 118, and continue on through the exit window 120 and into the eye 122. The direct view prism 111 is coupled or cemented to the aspheric beam combining surface of the ocular relay prism 110. The curve of the direct view prism at the interface with surface 118 cancels the effect of the aspheric beam combining surface on the direct view visible light and allows the superposition of the direct view scene upon the intensified filtered (i.e. green) scene. Note that all the visible light, except for a narrow bandwidth in the green, passes through the above-described optical assembly. Note further that FIG. 9B illustrates an unfolded optical illustration of FIG. 9A indicating how the three bundles of visible rays at +20, 0, and −20° field of view pass through the ocular assembly.

As previously mentioned with reference to FIG. 9A, beam combiner assembly 109 comprises ocular relay prism 110 and direct view prism 111. The ocular relay prism 110 receives intensified light through its aspheric input window 119 and a highly aberrated image is formed near the center of the prism. Such large aberrations in this region permit the system to be insensitive to localized inhomogenities in plastic material. The light rays then propagate to the aspheric beam combiner surface 118 by wave of reflective surface 121. This surface has a dichroic coating that reflects the green light but passes all other colors. This allows direct viewing of the scenes with little distortion. The green light reflected off of the aspheric reflective surface 118 travels to aspheric beam combining surface 121, where the reflected light is collimated over a 40° field of view to the eye upon exiting the ocular relay prism at exit window 120. Note that the ocular relay prism 110 includes distortion and other aberrations that are equal and opposite to the distortion and aberrations of the relay lens 107, right angle prism 108, cube prism beam splitter 112 and image intensifier window 117, which results in a high resolution, undistorted image at the eye 122. Note further that the surfaces 119, 118, and 121 are aspheric surfaces that may be fabricated using conventional diamond turning machines. All other surfaces are plano. If surfaces 119, 118 and 121 are non-rotationally symmetric surfaces, then the tilts and decentrations in the relay lens 107 may be eliminated.

As has been described, the present invention need not be limited to night vision apparatuses, but may be utilized in applications including a virtual reality viewer for computer generated images, in addition to the application of night vision devices for ground troops aviators and vehicle drivers. Moreover, the present apparatus may operate to replace existing prior art devices, including the AN/PVS-7, ANVIS-6, PVS-14, Land Warrior and all other unit magnification night vision goggle or visor systems.

It should be understood that the embodiments described herein are merely exemplary, and that a person skilled in the art may make variations and modifications without departing from the spirit and the scope of the invention. All such variations and modifications are intended to be within the scope of the invention as defined in the appended claims.

What is claimed is:

1. A night vision device comprising:
 a facemask housing assembly having a peripheral surface defined by a rear surface contoured to a user's face and an open front surface, said housing assembly operative for encasing a pair of optical assemblies, said optical assemblies operative for receiving light from a viewed object via a first folded optical path and via a second direct optical path, combining said light from said first and second paths, and directing said combined light to a user's eye for viewing said object; each said optical assembly detachably coupled to said housing assembly, wherein each optical assembly comprises:
  an objective lens assembly for receiving and focusing visible and infrared light from a viewed object along said first folded optical path;
  image intensifier means responsive to said focused light from said objective lens assembly for converting the visible and infrared light to visible intensified light;
  and beam combining means responsive to said visible intensified light and to said direct path light for combining with one another and directing the combination to said user's eye for viewing.

2. The night vision device according to claim 1, further comprising a protective visor lens attachable to said front surface of said housing assembly.

3. The night vision device according to claim 2, wherein said protective visor lens comprises a polycarbonate material for providing ballistic or laser protection.

4. The night vision device according to claim 3, wherein said protective visor lens has a thickness of substantially 2 millimeters.

5. The night vision device according to claim 2, wherein said protective visor lens is a 1 mm thick acetate lens.

6. The night vision device according to claim 1, wherein said face mask housing assembly is monolithic and comprised of a non-metallic material.

7. The night vision device according to claim 6, wherein said non-metallic material is carbon-filled.

8. The night vision device according to claim 1, wherein said housing assembly includes a chassis coupled to an interior surface opposite to said peripheral surface and operative for coupling said optical assembly with said housing assembly.

9. The night vision device according to claim 1, further comprising an infrared illumination device coupled to the interior of said housing assembly for providing forward projection illumination.

10. The night vision device according to claim 9, further comprising a photo-detector located on said interior surface of said housing assembly for detecting natural illumination and turning off said image intensifier means in response to said natural illumination exceeding a predetermined threshold.

11. The night vision device according to claim 10, further comprising optical adjustment means operative on said objective lens assembly and said ocular lens assembly for accommodating interpupilliary adjustment between a range of 51 mm to 73 mm.

12. The night vision device according to claim 1, wherein said peripheral surface of said housing assembly includes a transparent bottom portion for providing said user with the capability to view an area located below said transparent portion.

13. The night vision device according to claim 1, wherein said peripheral surface has a width of substantially 50 mm.

14. The night vision device according to claim 13, further comprising mounting means coupled to a top portion of said peripheral surface of said housing assembly for attaching to a peripheral unit, said peripheral unit selected from the group consisting of a user's head or helmet.

15. The night vision device according to claim 1, wherein said objective lens assembly has an aperture of F/1.2 and a 40° field of view.

16. The night vision device according to claim 15, wherein said image intensifier means includes an image intensifier tube having an active diameter of 16 mm.

17. The night vision device according to claim 1, further comprising means for insertion of symbology data into said first folded optical path for viewing of symbology data by said user.

18. A housing assembly for use with a night vision device for accommodating a pair of optical assemblies each associated with a respective eye comprising:
 a frame contoured to engage a user's face and having an open front portion for receiving a transparent visor to enable direct view of an object; and
 attachment means within an interior surface of said frame for detachably coupling a respective one of said optical assemblies to said frame.

19. The housing assembly according to claim 18, wherein a bottom surface of said frame includes an open portion for receiving a transparent material to permit said user to view objects through said open portion, thereby providing said user an enhanced field of view.

20. The housing assembly according to claim 18, wherein each said optical assembly includes an objective lens for receiving and focusing light from a viewed objective, an image intensifier coupled to said objective lens for generating an intensified image of said viewed object and an ocular lens assembly coupled to said image intensifier for receiving said intensified image originating from said objective lens assembly and combining with light received directly through said housing for combining said paths to form an image of said viewed object to the eye of the user.

* * * * *